Patented Nov. 22, 1949

2,489,215

UNITED STATES PATENT OFFICE 2,489,215

SEPARATION OF DIPHENYLBENZENE ISOMERS BY DISTILLATION AND CRYSTALLIZATION

Russell L. Jenkins, Anniston, Ala., assignor to Monsanto Chemical Company, a corporation of Delaware No Drawing. Application July 18, 1942, Serial No. 451,492

8 Claims. (Cl. 202—70)

The object of this invention is to prepare wax-like fractions of aromatic hydrocarbons.

A further object is the preparation of wax-like fractions from the crude pyrolytic residues obtained from the diphenyl synthesis operation.

A still further object is to provide certain aromatic wax-like fractions of improved blending characteristics.

In the preparation of diphenyl by the pyrolysis of benzol, a material proportion of the benzol pyrolyzed is obtained as a residue boiling appreciably higher than the boiling point of diphenyl. This residue boils above about 250° C. and consists mainly of the diphenyl benzenes together with other condensed ring hydrocarbons which are mostly of unknown composition at the present time.

After the removal of minor amounts of diphenyl, the herein designated "diphenyl high boiler" may have the following composition as determined by fractional distillation:

|  | Per cent |
|---|---|
| Ortho-diphenylbenzene | 7.6 |
| Meta-diphenylbenzene | 46.1 |
| Para-diphenylbenzene | 17.5 |
| Unknown condensed ring compounds | Balance |

I have now found that certain of the isomers of diphenylbenzene, that is, the ortho-, meta- and para-isomers, may be separated in the form of crystalline to crystalline-wax-like fractions by a process involving a distillation of the lower boiling ortho-isomer followed by the distillation of the meta- and para-isomers as one fraction, after which the meta-para-fraction is subjected to a heat treatment followed by separation of the liquid and solid phases. The distillation of the meta-para-fraction has been found to yield, upon solidification, a solid wax-like mixture in which the crystals of para-diphenylbenzene are of considerable size and which crystals readily lend themselves to a heat treatment as for example, with steam in a centrifuge for further separation thereof into meta- and para-diphenylbenzene fractions.

The heat treatment of the meta-para-fraction is so carried out as to raise the temperature of the mixture above the melting point of the meta-fraction, in order to produce a mixture of solid para-diphenylbenzene crystals in a melt of liquid meta-diphenylbenzene. I have found that when such a mixture of solid para- and meta-diphenylbenzenes is maintained at or above the eutectic temperature of the meta-para mixture, that is, within the range beginning at about 84° C.–85° C. and 90° C.–95° C. or at most 100° C., the para-isomer is surprisingly insoluble in the meta-isomer. Hence when such a mixture of crystals is obtained, any available process suitable for separating crystals from liquids may be employed for effecting a separation of these isomers.

For practical purposes, treatment of the distilled crystalline mixture of the para- and meta-diphenylbenzenes may be conveniently effected in a centrifuge, in which steam is permitted to play upon the crystals in the basket and the meta-isomer in molten form is centrifuged out of the para-crystals as or after melting takes place.

In order to further illustrate my invention, I give the following example:

Example

A quantity of diphenyl high boiler having approximately the following composition:

|  | Per cent |
|---|---|
| Diphenyl | Trace |
| Ortho-diphenylbenzene | 7.6 |
| Meta-diphenylbenzene | 46.1 |
| Para-diphenylbenzene | 17.8 |
| Higher related hydrocarbons | Balance | is charged to an atmospheric still provided with a short fractionating column to separate, first, a fraction boiling at a temperature up to say 250° C.–260° C. This fraction will contain minor amounts of diphenyl which normally occur in the high boiling residue. The temperature of the still is then further raised to the range of 330° C.–350° C., and a second fraction is thereby obtained consisting largely of ortho-diphenylbenzene. This fraction comprises about 9% of the usual charge. The temperature is then further raised and an intermediate fraction boiling within the range of 350° C.–375° C. is collected. Usually the intermediate fraction consists of 10% of the charge. After the separation of the intermediate fraction, the temperature is still further raised until a temperature in the neighborhood of 390° C. is reached in the column. This fourth fraction which normally boils over the range of 375° C.–390° C. consists of a mixture of meta- and para-diphenylbenzene. The fourth fraction usually comprises about 56%–62% of the charge to the still.

The above fourth fraction, consisting of meta- and para-diphenylbenzene is allowed to crystallize by slow cooling and, if in massive form, is broken down by grinding or crushing into lumps not substantially larger than one inch in diameter. The crushed material is now charged to an ordinary basket-type centrifuge which is provided with a steam nozzle entering the basket and the fraction is then centrifuged while subjected to the action of live steam which preferably is wet and, hence, is at a temperature of about 100° C. During the steaming, the lower melting meta-diphenylbenzene is liquefied and removed from the para-diphenylbenzene by the action of the centrifuge. The condensed water from the steam assists in washing out the meta-isomer from the crystals in the basket and also from the centrifuge. The para-diphenylbenzene remaining contains from 2% to 5% of the meta-isomer.

By this means I obtain three aromatic hydrocarbon fractions having the following characteristics:

The ortho-diphenylbenzene fraction obtained as the first fraction from the still, after any diphenyl has been removed, is a mixture of from 80%–97% or 98% ortho-diphenylbenzene, the balance being meta-diphenylbenzene containing a trace of para-diphenylbenzene. This mixture of isomers has a melting point such that on raising the temperature thereof all of the crystals are liquid above 50° C. A fraction containing 97%–98% ortho-isomer with 3% to 2% meta-isomer will melt above about 55° C.

The product obtained as the liquid phase from the steam centrifuge consists of from 98.5% to 97% of meta-diphenylbenzene together with a small amount of para-diphenylbenzene. Generally, the para-diphenylbenzene which makes up the balance is about 2% by weight of this fraction—in any event, it is usually between 1½% and 3% thereof. The meta-diphenylbenzene fraction is characterized by a freezing range such that crystals will form in the molten fraction at temperatures beginning at about 90° C. The fraction itself exhibits a crystal hold point in the range of 83° C.–85° C.

The para-diphenylbenzene fraction, when molten and allowed to cool, exhibits a crystal formation at the temperature of 209° C. and consists of para-diphenylbenzene in the amount of 94%–98%, the balance being mainly meta-diphenylbenzene.

The above three fractions of the ortho-, meta- and para-diphenylbenzenes are, first, of such a degree of purity as to consist of crystalline to crystalline-wax-like solids of particular value for many purposes. Thus the ortho-diphenylbenzene fraction has some 2% or 3% up to 20%, usually 15%, of meta-diphenylbenzene therewith. The meta-diphenylbenzene fraction, while it comprises largely meta-diphenylbenzene, has associated therewith usually less than 3% para-diphenylbenzene. The para-diphenylbenzene fraction, while containing 94%–98% para-diphenylbenzene, has associated with it from 2%–6% of meta-diphenylbenzene.

For most purposes for which these waxes are utilized it is desirable that the fraction contain the indicated small amounts of the related isomers. For example when such small amounts of the related isomer are present, the fraction has somewhat more of a waxy or oily property and generally a greater compatibility with other waxes. The presence, for example, of the small amount of meta-diphenylbenzene in the para-isomer considerably minimizes sublimation of the para-isomer, since it is usual to incorporate these waxes at or above the melting and sublimation point.

The distillations involved in my process may be carried out at atmospheric pressure or under diminished pressure, as by distillation under a vacuum. The distillation temperatures given above are those employed when distilling at ordinary atmospheric pressure. When distilling at diminished pressures suitable variations may be made in the temperatures herein disclosed.

What I claim is:

1. The method of separating the isomers of diphenylbenzene contained in the high boiling residue obtained from the pyrolytic diphenyl synthesis process, comprising first removing from said residue a diphenyl-containing fraction by distillation to a temperature of within the range of 250° C. to 260° C., thereupon fractionating the remainder of said high boiling residue into two fractions, a first fraction boiling at a temperature in the range of from 330° C. to 350° C. and a second fraction containing principally meta- and para-diphenylbenzene and boiling above said temperature, solidifying said second fraction by slow cooling and thereupon treating said second fraction with atmospheric steam while centrifuging same.

2. The method of separating the isomers of diphenylbenzene into fractions, comprising fractionally distilling the substantially diphenyl-free high boiling residue obtained from the pyrolytic diphenyl synthesis process into two fractions, one fraction containing from 80% to 98% of ortho-diphenylbenzene together with 20% to 2% meta-diphenylbenzene, and a second fraction containing substantially only the meta- and para-diphenylbenzene isomers, thereupon subjecting said second fraction, after solidification by slow cooling, to centrifugal separating action in the presence of atmospheric steam.

3. The method of separating the isomers of diphenylbenzene contained in the high boiling residue obtained from the pyrolytic diphenyl synthesis process, comprising first removing from said residue a diphenyl-containing fraction by distillation to a temperature within the range of 250° C. to 260° C., fractionating the remainder of said high boiling residue into three fractions, a first fraction boiling at a temperature in the range of 330° C. to 350° C., a second fraction boiling at a temperature within the range of 350° C. to 375° C. and a third fraction containing principally meta- and para-diphenylbenzene boiling above 375° C., solidifying said third fraction by slow cooling and thereupon treating said third fraction with atmospheric steam while centrifuging the same.

4. In the method of separating the isomers of diphenylbenzene contained in the high boiling residue obtained in the pyrolytic diphenyl synthesis process, the step of treating a mixture containing substantially only meta- and para-diphenylbenzene with atmospheric steam while centrifuging the same.

5. The method of separating the isomers of diphenylbenzene, comprising distilling the crude mixture as obtained as a high boiling residue in the pyrolytic diphenyl synthesis process, and thereby separating said mixture into two fractions, one boiling, at atmospheric pressure, at a temperature within the range of 330° C. to 350° C. and one boiling at atmospheric pressure, above said temperature, solidifying said higher boiling fraction by cooling and thereupon treating said higher boiling fraction with atmospheric steam while centrifuging same.

6. The method of separating the isomers of diphenylbenzene, comprising distilling the crude mixture as obtained as a high boiling residue in the pyrolytic diphenyl synthesis process, and thereby separating a fraction boiling above 350° C. at atmospheric pressure, solidifying said fraction by slow cooling and thereupon treating said solidified fraction with atmospheric steam while centrifuging same.

7. The method of separating the isomers of diphenylbenzene, contained in the high boiling residue obtained in the pyrolytic diphenyl synthesis process, comprising distilling said high boiling residue to separate a fraction boiling within the range of from 375° C. to 390° C., solidifying said fraction by slow cooling and thereupon treating said fraction with atmospheric steam while centrifuging same.

8. The method of separating the isomers of diphenylbenzene, comprising distilling the crude mixture as obtained as a high boiling residue in the pyrolytic diphenyl synthesis process, and thereby separating said mixture into two fractions, one boiling at atmospheric pressure within the range of from 330° C. to 350° C. and one boiling at atmospheric pressure at a temperature within the range of 375° C. to 390° C., solidifying the higher boiling fraction by slow cooling and thereupon treating said high boiling fraction with atmospheric steam while centrifuging same.

RUSSELL L. JENKINS.

REFERENCES CITED

The following references are of record in the file of this patent:

UNITED STATES PATENTS

| Number | Name | Date |
| --- | --- | --- |
| 433,339 | Forbes | July 29, 1890 |
| 1,180,599 | Murphy | Apr. 25, 1916 |
| 1,559,982 | Petty | Nov. 3, 1925 |
| 1,890,427 | Britton | Dec. 6, 1932 |
| 1,910,920 | Higgins | May 23, 1933 |
| 1,917,822 | Britton | July 11, 1933 |
| 1,940,065 | Spannagel et al. | Dec. 19, 1933 |
| 1,943,078 | Kahl | Jan. 9, 1934 |
| 2,129,908 | Britton | Sept. 13, 1938 |

FOREIGN PATENTS

| Number | Country | Date |
| --- | --- | --- |
| 723,642 | France | Jan. 18, 1932 |

OTHER REFERENCES

Rossini, Refinery and Natural Gasoline Manufacturer, Nov. 1937, pages 545, 546, 547, 548, and 561.